Aug. 31, 1954 C. A. GATES 2,687,632

DRY CLEANING SYSTEM, METHOD AND APPARATUS

Filed Aug. 14, 1948 7 Sheets-Sheet 1

INVENTOR.
Charles A. Gates
BY
Thiess, Olson & Mecklenburger.
Attorneys.

DRY CLEANING SYSTEM, METHOD AND APPARATUS

Filed Aug. 14, 1948 7 Sheets-Sheet 2

INVENTOR.
Charles A. Gates
BY
Thiess, Olson & Mecklenburger.
Attorneys

Aug. 31, 1954 C. A. GATES 2,687,632

DRY CLEANING SYSTEM, METHOD AND APPARATUS

Filed Aug. 14, 1948 7 Sheets-Sheet 3

INVENTOR.
Charles A. Gates
BY
Thiess, Olson & Mecklenburger.
Attorneys

Aug. 31, 1954 C. A. GATES 2,687,632

DRY CLEANING SYSTEM, METHOD AND APPARATUS

Filed Aug. 14, 1948 7 Sheets-Sheet 4

INVENTOR.
Charles A. Gates
BY
Bliss, Olsen & Mecklenburger,
Attorneys

INVENTOR.
Charles A. Gates
BY
Thiess, Olson & Mecklenburger
Attorneys

DRY CLEANING SYSTEM, METHOD AND APPARATUS

Filed Aug. 14, 1948 7 Sheets-Sheet 6

INVENTOR.
Charles A. Gates
BY
Thiess, Olson & Mecklenburger
Attorneys

INVENTOR.
Charles A. Gates
BY
Thiess, Olson & Mecklenburger
Attorneys

Patented Aug. 31, 1954 2,687,632

UNITED STATES PATENT OFFICE 2,687,632

DRY CLEANING SYSTEM, METHOD, AND APPARATUS

Charles A. Gates, Downers Grove, Ill., assignor to G. H. Bishop Co., Chicago, Ill., a corporation of Illinois Application August 14, 1948, Serial No. 44,375

12 Claims. (Cl. 68—18)

This invention relates particularly to improvements in dry-cleaning systems, methods and apparatus, and has for objects the better handling and utilization of the filter powder or the like in the system and the prevention of the passage of air through the filter screens.

It is customary in dry-cleaning plants to dump filter powder into the washer on the garments or fabrics therein to be cleaned. Sometimes the powder has been dumped into the button trap; at other times a batch of dry powder is dumped into the line. All are objectionable for various reasons.

An object of this invention is to provide improved means and methods for feeding the powder while in suspension in solvent into the stream of solvent from the washer and button trap and into the suction line of the pump, whereby without going through either the washer or button trap it is carried directly by the pump to the filter in a uniform and distributed manner and rate.

A further object of the invention is to provide improved means and methods of so feeding the powder to the system by utilizing the power and means within the system for operating the same, thus requiring no external source of power or apparatus therefor.

A still further object is to provide improved means and methods for feeding powder to the system by mixing the same with solvent taken from the system as and when needed for mixing and discharge into the system.

A further object of the invention is to provide improved means and methods for introducing the powder into the feeder in definite dry batch amounts and the feeder to feed the powder into the system gradually at a uniform rate while in suspension in solvent.

A further object of the invention is the provision of a powder-feeding device for mixing the powder and solvent and discharging the same into the system, a powder-metering device for introducing the powder into the feeder in batches, and a flexible hopper atop the meter for holding the powder in bulk for the meter.

A further object of the invention is to provide improved means and methods for eliminating the air from the filter during operation of the system.

A further object of the invention is the provision of a powder feeder for a dry-cleaning system involving a mixing chamber for the powder and solvent and drawing its solvent from the low-pressure side of the filter in the circuit, and a liquid bleeder connection from the top of the high-pressure side of the filter to the solvent connection of the feeder, whereby when the feeder is working, the bleeder stream is drawing the air from the filter.

Further objects and advantages will appear from the description and claims to follow, in connection with the accompanying drawings, which illustrate, by way of example but not of limitation, one embodiment of the invention, and in which—

Figure 1:
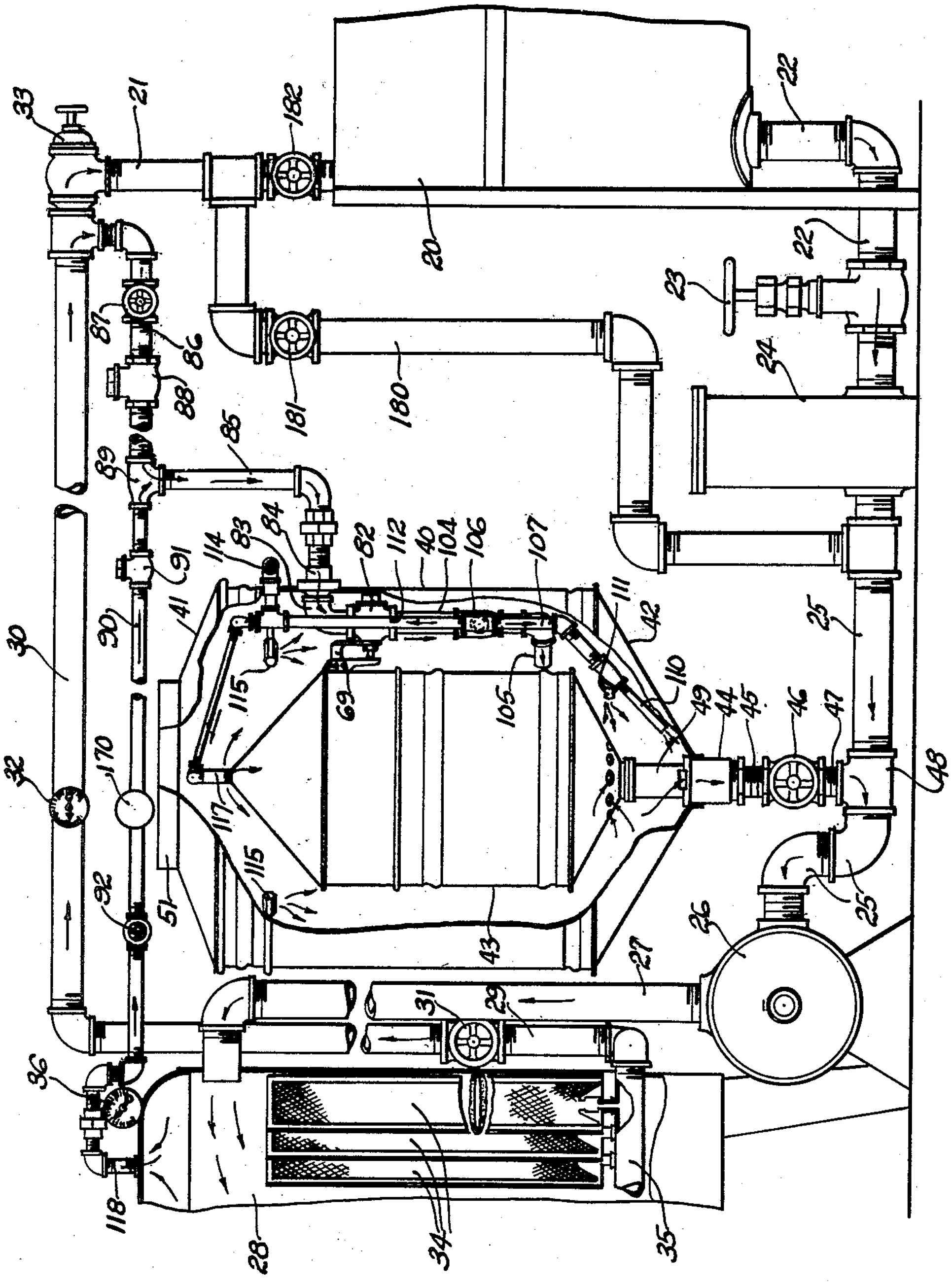
Fig. 1 is a diagrammatic view of a closed-circuit recycling dry-cleaning system embodying the invention and with only the main elements involved in the features of the invention shown therein.

Referring first to Fig. 1, the washer 20, indicated only in partial outline, may be of any type desired and is adapted to be opened to receive the garments or fabric to be cleaned and for their removal therefrom after treatment.

Clean liquid cleaning solvent is admitted to the washer through the pipe 21 in the desired quantity, and during treatment of the load of garments therein the soiled solvent is drawn off through the pipe 22 containing gate valve 23 and suitable trap 24, the latter to take out buttons and the coarser impurities in the solvent, and thence through pipe 25 to the suction inlet of the solvent-circulating pump 26. This pump, which may be of any desired type, then forces the solvent through the pipe 27 into the upper part of the filter 28. This filter, which may be of the usual or desired type, takes the remaining dirt out of the solvent and passes the clean solvent on into the pipes 29 and 30 of the system to the pipe 21 leading to the washer 20, thus completing the circuit of the system, which is of the closed recycling type. In the pipe 29 there is a shut-off hand valve 31 and on the pipe 30 a pressure gauge 32, and at the junction of pipes 30 and 21 a spring loaded relief hand valve 33 is placed, which may preferably be set to open on a minimum of 10 lbs. pressure at the valve. This relief valve 33 has the effect of producing or insuring a pressure in the line 30, which is utilized in the operation of the powder feeder, as hereafter explained, but it also causes some back pressure on the filter. This, however, is not a detriment to the operation of the filter, but is found to be an advantage in that the coatings of powder on the filter screens are softened and more yielding, are more uniform, are not packed so hard, and the liquid solvent seeps through it easier and better than if such back pressure were not imposed.

The filter 28 is provided with the usual or desired hollow filter screens 34, which may be made up of a rectangular coarse central drainage screen covered on each side with a fine wire mesh filtering screen or canvas filtering cloths. The edges of the filter plate thus made up are sealed tightly. If canvas cloth be used, it may be sewn into a bag, pulled over the drainage screen and tightly closed.

The interior of the lower ends of these screens is connected through suitable outlet nipples into a manifold pipe 35 which connects with the return pipe 29.

This filter construction, as stated, may be of any usual or desired construction and operates in the well-known manner. It is only partially shown in the drawing. The solvent from the washer and pump fills the filter tank or shell around the filter screens. It is under pressure from the pump. A pressure gauge 36 is at the top of the filter and may register 20 lbs. or so, depending among other things on how much dirt may be present in the filter screens.

The construction at the bottom of the filter tank is not shown but may be anything desired to enable the same to be cleaned out of dirt, impurities, powder fallen from the screens, coke, etc., which may collect there. The filter screens may be removed or otherwise handled for cleaning purposes.

As is well known, the solvent coming from the washer is pumped into the space in the filter tank around the screens and passes from the exterior of the screens through both sides into the interiors thereof. In so doing, the organic impurities in the solvent are filtered out by the screens and the cleaned solvent flows down into the manifold and out into the clean solvent supply lines 29 and 30.

In order to keep the screens open and prevent them from clogging, it is customary to coat the screens on both sides with so-called filter powder, such as finely divided cellular silica, diatomaceous or fuller's earth, or the like; and to do this by putting the powder into the washer with the clothes. This latter is objectionable for various reasons, among which may be mentioned that the powder may not get thoroughly and uniformly mixed with the solvent, may spot the clothes, may go out into the drain in masses, tends to clog the button trap, and may not be deposited evenly and uniformly on the screens in the filter.

In order to overcome these and other objections and to provide a system and apparatus therefor having advantages not heretofore enjoyed, a filter powder feeder is connected with its discharge to the line or circuit of the system in advance of the suction intake of the pump and beyond the washer and preferably after the button trap, if any, whereby when suitably controlled and operated the powder may be fed automatically, uniformly and substantially continuously to the line and be carried to and deposited on the filter screens in uniform and even layers, as desired. Such feeder preferably is unitary, self-contained, operated by the power of and from within the system and not requiring any outside source of power or additional apparatus except possibly the provision of such a relief valve in the line as above mentioned. It is therefore most readily applied to such cleaning systems, new or old, without extra cost and room space requirements.

Figure 2:
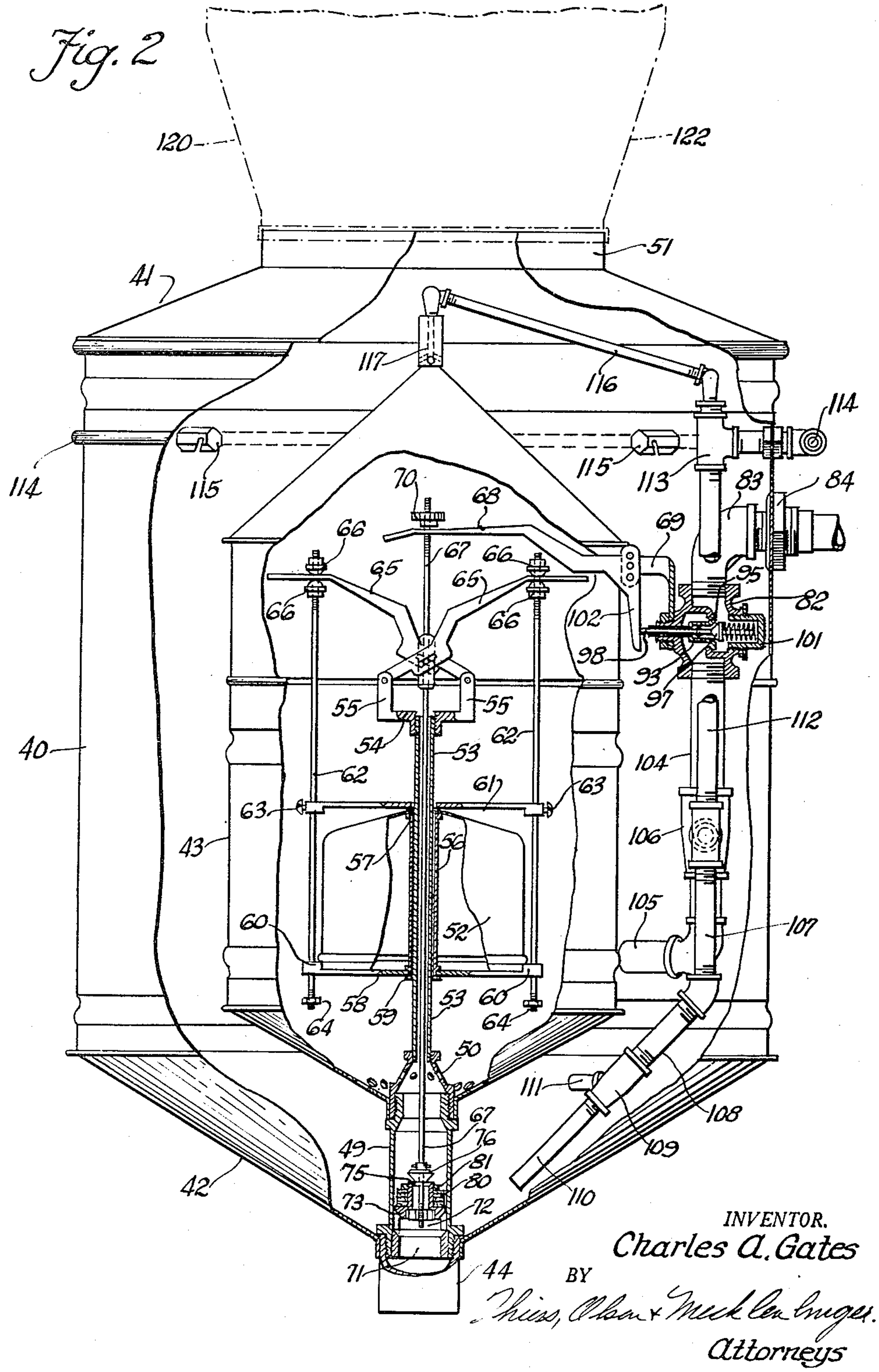
Fig. 2 is an elevational view of the filter powder and solvent mixer and feeder or injector of the system on a larger scale than in Fig. 1 and with parts of the outer casing or housing and of the inner float chamber broken away to show the mechanism therein, parts of the same and of the inlet and outlet valves of the housing being shown in section.
Figure 3:
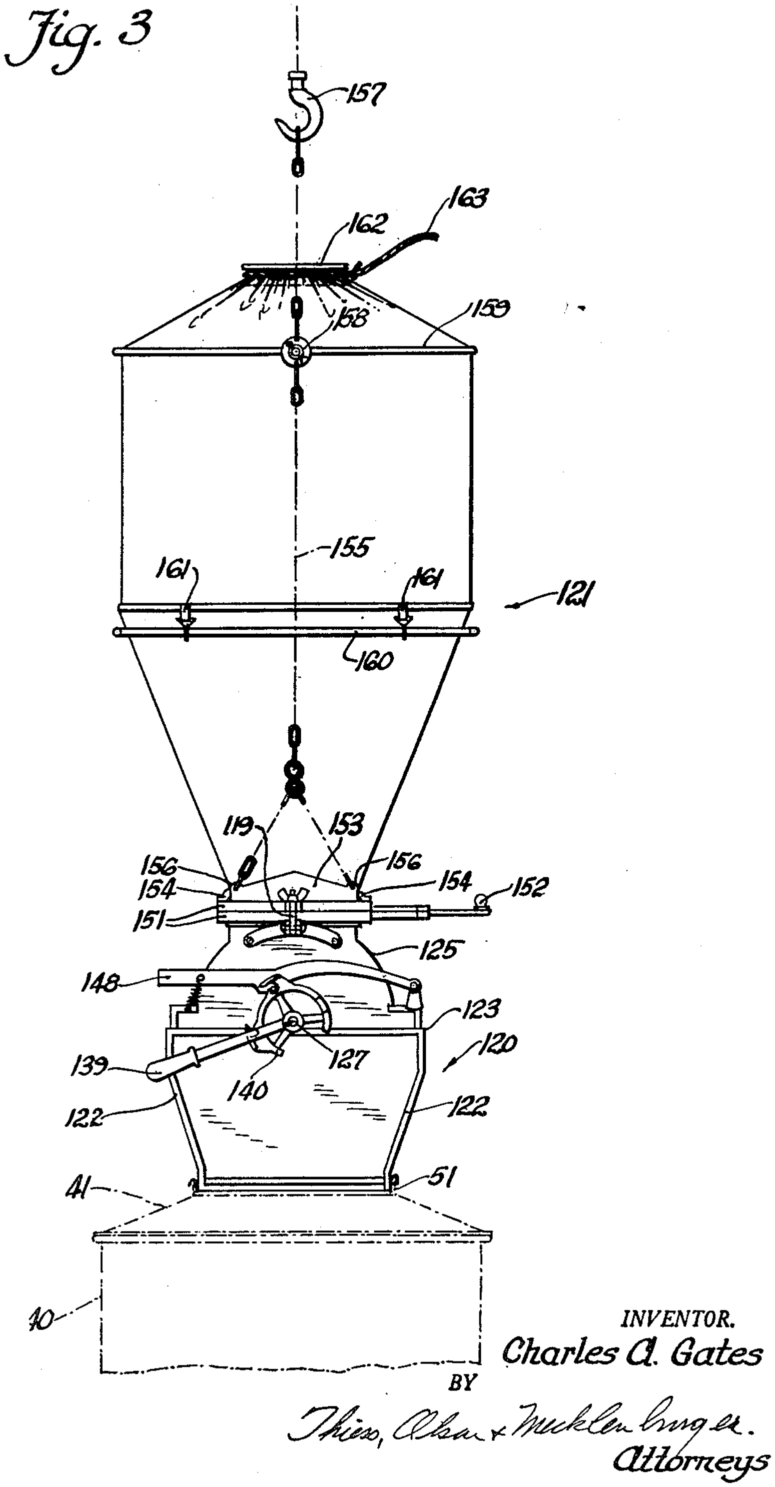
Fig. 3 is an elevational view of the means for conveniently feeding the filter powder in the desired quantities to the feeder and based on measured quantities of the powder.

This filter powder feeder, Figs. 1, 2 and 3, comprises an outer, preferably cylindrical, sheet metal housing 40 with sloping ends 41 and 42, with a similarly formed inner float chamber 43. The outer housing is supported at its lower end 42 by a short section of pipe 44 welded or otherwise secured to end 42 and threaded at its lower end onto a threaded pipe section 45 connected to the casing of gate valve 46 and which in turn is connected by a short pipe section 47 extending from a coupling 48 in suction pipe 25 of the pump. While these sections of pipe 45 and 47 are shown short in Fig. 1, it will be understood that they may be of any length desired suitably to locate the feeder and valve in the desired locations in the particular plant where the system may be installed. And the same applies, of course, to the inlet pipe of the feeder, later described. In fact, the whole system of Fig. 1 is diagrammatically shown and may be greatly varied in installation so long as the proper connections are maintained.

The float housing or casing 43 is similarly supported at its lower end by the barrel or casing of the outlet valve 49 of the housing, to be described later. The lower end of this valve casing may be threaded into the upper end of pipe section 44, Fig. 2, and at its upper end be threaded into the conical member 50 forming a cap for the barrel which extends up into the float chamber 43, and to the outside of its lower end the central flange of the float chamber may be tightly secured.

The result is that the two enclosures 40 and 43 are held upright and spaced apart as indicated.

The upper end 41 of the housing 40 has a flanged opening 51 of relatively large size and which may be rectangular to fit the bottom of the powder dumper or measuring device to be described later. The dry filter powder is introduced into the housing 40 through this opening as described later, and slides down the sloping top and at the sides of the float chamber 43 and into a bath of solvent liquid which has been let into the housing from the pipe 30 by a suitable inlet valve. The solvent and powder are mixed together in this housing and the mixture is discharged therefrom through the outlet valve before referred to. These inlet and outlet valves are controlled by a float 52, Fig. 2, in the float chamber and which is suitably operated, that is, raised and lowered by the liquid solvent in the housing 43, as will be described.

Specifically, a tubular standard 53 extends verticaly from the cap member 50 of valve chamber 49 to a horizontal bracket 54 at its upper end having the upright end arms 55. A freely sliding vertical sleeve 56 surrounds the tube 53. The closed top end of the sheet metal float 52 is tightly and rigidly secured to the upper flanged end 57 of this sleeve. The float 52 is of the open-bottom type. A cross member 58 is secured to the lower flanged end of sleeve 56, as at 59. The lower edge of the float beneath the strengthening bead is embraced by the thickened ends 60 of member 58. At the upper end of the float 52, but not attached thereto, another member 61 extends across, parallel to the similar member 58 below.

Vertical rods 62 pass through the ends of arms or cross members 58 and 61, the latter being secured to the rods by set-screws 63, while the ends of arms 58 are slidable on the rods, downward movement thereon being limited by the nuts 64 near the lower ends of the said rods. Accordingly, the float 52 may move independently up and down on the tubular standard 53 for a short distance between the cross member 61 at the top and the nuts 64 on the rods 62 at the bottom. Any further movement of the float, however, in either direction results in carrying the vertical rods 62 up or down, since it engages the cross member 61 at the top, and through the cross member 58 it engages the nuts 64 at the bottom.

In the upper part of the float chamber, the vertical rods 62 pass through the slotted ends of a pair of second-class levers 65 which are fulcrumed, respectively, at their other ends to the upstanding ends 55 of bracket 54, which is fixedly carried at the upper end of tubular standard 53. Adjustable nuts 66 with rounded lever-engaging faces are mounted on the vertical rods above and below the slotted ends of levers 66 to permit freedom of movement between the rods and levers, the rods moving vertically and the levers being pivoted at their inner ends.

These levers 65 are suitably connected to a valve-operating rod 67 which extends all the way through the tubular standard 53 and is attached at its lower end to the outlet valve at the bottom of casing 40 and in valve casing 49. At its upper end the rod 67 passes through the end of the inlet valve operating lever 68 which is adjustably pivoted on a bracket 69 just outside the float chamber casing 43, the lever passing through a slot or suitable opening in the casing wall, and the bracket, as will be explained, being mounted on the inlet valve structure. The rod 67 carries a nut 70 on the upper side of the lever 68, the aperture through the lever for the rod 67 providing clearance for freedom of the slight relative movement of the two when in operation. As shown, the long arm of lever 68 is pulled down by the descent of the rod 67, but is raised by the spring in the inlet valve, to be described.

The pivotal connection of twin levers 65 with the valve rod 67 may be varied, but, as shown, the levers may pass one on either side of the rod 67 or a bushing thereon and a transverse pin pass through the rod and bushing and through slots in the levers, so that as the outer ends of the levers are raised and lowered, the pin sliding in the slots will raise or lower the rod 67.

Figure 12:
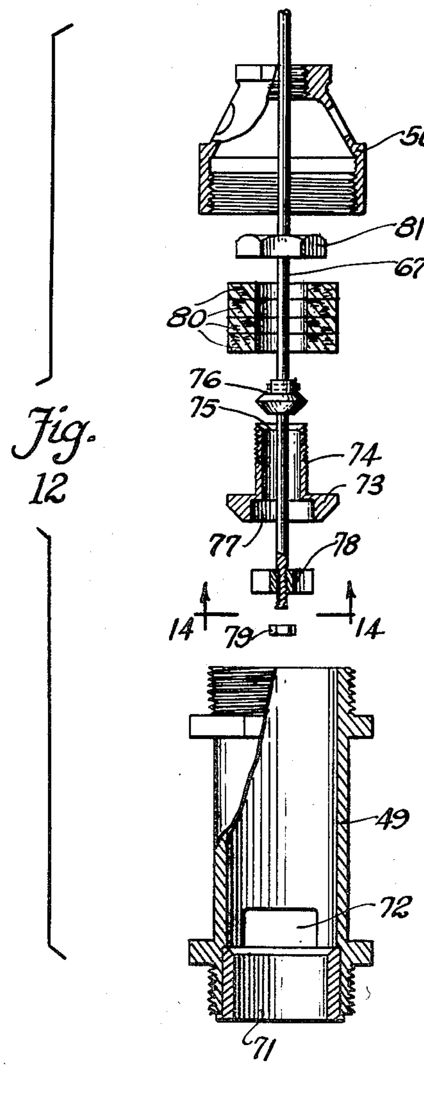
Figures 13, 14, 15:
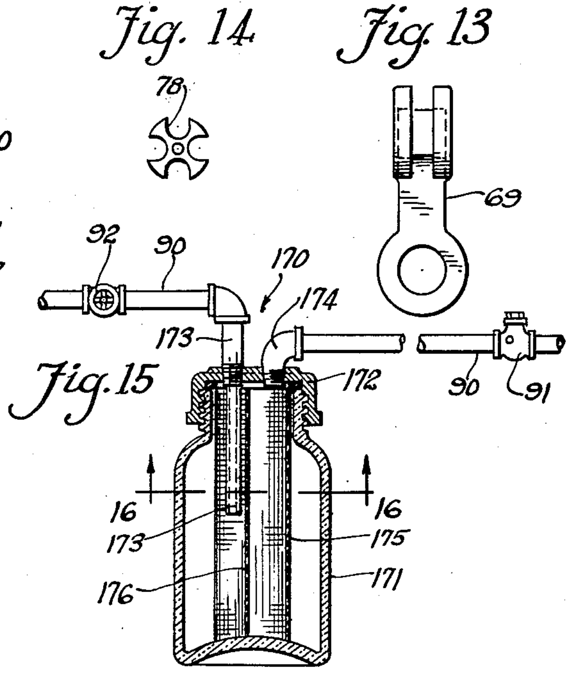
Fig. 13 is a detail view of the bracket on line 13—13 of Fig. 11.
Fig. 14 is a detail view on line 14—14 of Fig. 12 of the outlet valve stem guide and stop.
Fig. 15 is a detail view of the visual indicator and filter.

The discharge valve 49, which controls the flow of solvent from the feeder 40 caused by gravity and the suction of the solvent pump 26, Figs. 2, 12 and 14, comprises the barrel or housing threading into the top of pipe 44 and having the ring valve seat 71 tightly fitting into its lower end. Ports 72 diametrically opposite each other, only one being shown, are formed in the lower part of this barrel just above the ring seat 71. A valve disc 73 co-operating with said seat 71 to open and close the passage therethrough is provided with an upwardly extending sleeve 74 having a smaller ring valve seat 75 at its upper end. A small valve disc 76 is mounted on and secured to valve rod 67 and co-operates with seat 75 to open and close the passage through this smaller valve and the sleeve 74 and valve disc 73.

A recess 77 is formed in the lower face of main valve disc 73 and into this is slidingly fitted spider-like member 78, Fig. 14, which is threadedly attached to rod 67 and locked in place by nut 79. When assembled on the rod 67, the member 78 and small valve 76 are so located on the rod 67 that the main valve has a slight lost motion therebetween, preferably slightly less than the depth of the recess 77 in the base of disc 73, so that the spider 78 may not draw entirely out of the recess.

A plurality of leather washers 80 are mounted on the sleeve 74 of the valve and are compressed in position by the nut 81. They serve to keep the valve member 73—74 in proper position within the barrel despite a rush of liquid down through the barrel from above when the valve 76 is opened. The upper end of the barrel 49 is covered by the cap 50 which is provided with a series of outlet holes for the passage of the solvent therethrough.

With this arrangement of combined small and large valves, chattering on the verge of opening and closing of the same is largely prevented, and in case conditions produce a heavy vacuum pull on the valve, tending strongly to hold it closed, the vacuum is more readily broken through the opening of the small valve first which is well within the power of the float to do. Otherwise, a larger float, longer float travel and longer twin levers might be required.

The inlet valve 82 is located within the feeder housing 40 near the upper portion and is supported by the pipe elbow 83 and suitably connected thereby through coupling 84 to the side wall of the casing 40 and thence by the usual couplings and elbow to the inlet pipe 85, which in turn is connected by pipe 86 to the clean solvent pipe 30 of the system. This inlet pipe 86 includes a gate valve 87 and a check valve 88. A T-connection 89 at the junction of pipes 85 and 86 provides for the connection with this inlet pipe 85 of a smaller pipe 90 coming from the top of the filter 28, the purpose of which will be described later. It may be said, however, that a check valve 91 and a gate valve 92 are in this small pipe 90, the check valve preventing the flow of solvent from the intake pipe 86 to the pipe 90, and likewise the check valve 88 in the inlet pipe prevents material from pipe 90 flowing back through pipe 86.

Figure 11:
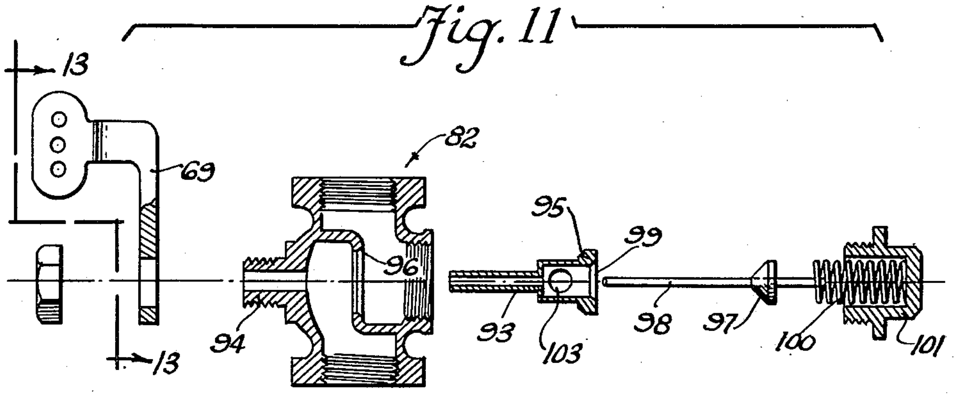
Figs. 11 and 12 are, respectively, exploded views of the inlet and outlet valves of the powder feeder.

The inlet valve 82 itself, Figs. 2 and 11, is provided with a valve core 93, the tubular stem portion of which is slidable endwise in projection 94 of the valve casing and the disc portion of which forms a valve 95 which is adapted to close on the circular valve seat 96 in the partitioning web of the valve casing.

A small valve 97 on a stem rod 98, which extends through the bore of portion 93 of the main valve, is adapted to seat on the ring seat 99 in the main valve disc 95. A coil spring 100 seats on this stem 98 and is enclosed in cap 101 which is threaded into the main valve casing. When assembled as in Fig. 2, the end of stem 98 projects beyond the end of tubular core 93, and both ends are in the path of the short arm 102 of lever 68. When said lever 68 is pulled down by the float 52, the end of stem 98 is first engaged by the arm 102 of the lever and opens the small valve 97. A further movement of the lever in the same direction causes arm 102 to engage the end of tubular core 93 to open the main valve 95. When the lever is moved in the opposite direction, the valves close in the reverse order, the larger first due to the liquid pressure, and the smaller last, the liquid pressure and spring 100 in the valve cap serving to so close them and move the lever 68 to its original position. The enlarged part of the stem portion of valve 95, Fig. 11, has ports 103 diametrically opposite each other which open into the discharge side of the valve 82, so that when small valve 97 is opened while the large valve 95 is closed, the solvent may pass therethrough and out of the valve.

The outlet valve is preferably somewhat larger than the inlet valve to be sure of discharging as much volume from the feeder 40 as is coming into it and thus keeping the inlet stream coming in to provide substantially constant agitation of the mixture in the receptacle. Thus the arrangement is such that the small inlet valve 95 remains open to a small extent at least at all times except when valve 46 or 87 is closed or a stoppage occurs, whereby the desired agitation by the jets at the lower end of the inlet pipes is secured. The small outlet valve cooperates at such times so that the solvent is flowing through the feeder substantially at all times.

In case of unusual pressure in the inlet line, the valves are still operable in the manner described, since the smaller takes less power to operate and relieves the pressure so that the larger then may be operated readily by the float. And under ordinary pressures, they substantially prevent chattering of the valves in so opening and closing.

The bracket 69 for pivotally supporting the lever 68 is mounted on the projecting portion 94 of the valve casing, and is provided with several pivot holes for adjustment purposes. This bracket is shown in Fig. 13, looking in the direction of the arrows 13, 13 in Fig. 11.

Obviously, as thus constructed and arranged, when the level of the solvent in the housing 40 lowers, the float 52 operate lever 68 to open the inlet valve 82 to admit solvent from the inlet pipes 85, 86 which are connected to the main return pipe 30. When the solvent rises in the housing 40, the float rises and the solvent in the pipe and the spring in inlet valve 82 close the inlet valves, as described.

As shown in Figs. 1 and 2, the discharge side of inlet valve 82 is connected to a vertical pipe 104 which terminates in a nozzle 105 preferably directed horizontally and tangentially within the receptacle 40. An H-coupling 106 in this pipe 104 enables another down pipe 107 to be connected therewith, and this terminates in a downwardly slanting end portion 108 having a coupling 109 therein and a nozzle-like end 110 directed in general toward the port of the outlet valve 49. A second nozzle-like end 111 is connected to coupling 109 and is directed horizontally and more or less tangentially. Such nozzles and connections may be provided in greater or less number and locations, the object being to keep the solvent and powder in the container 40 in agitation so that the powder is suspended throughout the solvent and to prevent a swirl developing about the valve and to keep the discharge ports 72 open. Even if some of the powder settled or tended to settle around the ports during a period of non-use of the feeder, the jet from the nozzle or nozzles 110 would stir it up and clear the ports when the inlet valve was opened again. This action of the nozzles makes a thin mixture of the powder and solvent, a stream of which, suitably controlled by the valves 46 or 87 or both, as later explained, is carried into the flow of solvent from the washer and then into the filter. Thus the powder does not go into the filter in a lump but is distributed through the whole of the solvent at the rate desired.

Referring again to the H-coupling 106 in the discharge pipe from the intake valve 82, a pipe 112 leads upwardly therefrom to a coupling 113 near the inside top of the receptacle 40, from which a lateral branch leads through the side of the casing 40 to a small pipe 114 which extends around the outside of the housing 40 and is connected by branches extending inside the same and terminating in spray nozzles 115 in any desired number, preferably four, of which two are shown. Another branch pipe 116 may lead from the top of coupling 113 to a spray nozzle 117 over the apex of the float chamber 43. A screw (not shown) may be inserted down through the block of nozzle 117 into the tip of chamber 43 and thus laterally brace the chamber at the upper end through the medium of pipe 116.

The powder, which is introduced into the housing 40 through the top opening 51, falls on the top of the float chamber 43 and slides off down over the edge and between the side walls of the two containers. These surfaces may be more or less damp and some of the powder may tend to stick thereto. The spray from the nozzles 115 and 117, however, strikes these surfaces and washes the powder down into the body of solvent below.

When, therefore, the solvent which is under pressure in the inlet pipe 85 is permitted to flow through the inlet valve 82, it is still under sufficient pressure to flow to and spray at the nozzles 115 and 117, and to spurt as jets from the various nozzles below.

In the operation of the system, when the pump 26 is operating and the valve 87 in the inlet pipe 86 to the feeder and the valve 46 in the discharge line from the feeder are open, the solvent fills the lower parts of the outer and inner housing or casings 40 and 43, the latter being suitably airvented at or near the top, and operates the float 52. In case the liquid comes in faster than it is being discharged, the float rises and closes or partially closes the inlet valve 82 and opens or further opens the discharge valve 49. If the reverse occurs, so that the fluid in the tank 40 flows out faster than it comes in, the float lowers to restrict the flow through the outlet valve and increase it through the inlet valve. This stops the downward movement of the float and soon causes it to rise. The float thus takes up a position of slight vibration or rise and fall which permits the fluid to flow through the feeder continuously at a substantially uniform rate. This rate may be varied by regulating the gate valve 46 or the gate valve 87, or even by varying the spring on the relief valve 33. The higher the pressure in the line, the faster the feeder will feed. The body of solvent maintained in the feeder depends upon these and other adjustments and conditions. If the level of solvent in the feeder is about the same or a little above that in the washer, the feeding of the solvent and powder into the circuit may be more even.

Thus, the filter powder is introduced into the feeder in the desired amounts, is thoroughly mixed with solvent so as to be in suspension therein, and the mixture is discharged into the suction line of the pump at an even and uniform rate, and is further mixed and carried by the stream of solvent into the filter as impelled by the pump and where the powder is deposited on the filter screens as desired. This is all done, of course, without regard to the washer 20, which may be in any stage of operation, open or closed. The powder feeder by-passes the washer and button trap entirely and the powder is kept out of them. The necessity of scattering the powder on the clothes in the washer is avoided. All the operator has to do is to put the required amounts of powder into the top of the feeder, and its proper, gradual and continuous feeding into the system is taken care of without fouling up the clothes, the washer, the button trap or other parts.

In the operation of the system, more or less air works into the solvent as delivered to the filter by the pump. There is considerable agitation of the solvent as it is passed along, and the filter powder itself contains air. It is objectionable to force this air through the filter screens and is deleterious to them and to their operation. However, such air rises in the filter tank and tends to collect at the top. In this invention, a line or liquid bleeder pipe, as it may be termed, is connected to the top of the filter tank where the air tends so to collect, whereby the air, entrained in the liquid solvent, is carried therethrough, and the air is kept from going through the filter screens. Also, the air is discharged to the atmosphere and the solvent returned to the system. And this goes on while the washer is in operation. In fact, it takes place whenever the pump is in operation and the feeder is working normally.

Thus, as seen in Fig. 1, a bleeder pipe connection 113 at the top of the filter tank 28 is connected to bleeder line 90, which is provided with a gate valve 92 and check valve 91 and is connected to the coupling 89 in the powder feeder intake line 86—85. The stream of liquid from pipe 90 will flow into the intake stream of pipe 85 if for no other reason than that pipe 90 is of higher pressure than the pipe 85. This is essentially so because the bleeder is connected to the intake or pressure side of the filter while the powder feeder intake is connected through pipe 30 with the discharge side of the filter. The drop in pressure is due mainly to that required to force the solvent through the filter screens. This drop varies, depending upon the condition of the screens and other conditions, such, for instance, as whether the inlet valve of the powder feeder is open or how wide it is open. This difference in pressures is reflected in the pipes 90 and 85. The pipe 90 is much smaller than pipe 85, and though the pipe 90 comes from the contaminated solvent side of the filter, the volume of liquid solvent therein is small relative to the amount carried by the pipe 85, so that no harm results. If desired, a small visual indicator and filter 170, shown more in detail in Fig. 15, and later described, may be inserted in the line 90, but is not necessary to the operation of the system. When the bleeder stream reaches the feeder tank, the air therein escapes to the atmosphere, while the solvent remains in the tank to be mixed with the other solvent and powder and is again fed into the stream to the pump and thence to the filter. The check valve 88 in the powder feeder intake line prevents any contaminated liquid from pipe 90 getting into the intake 86 and pipe 30 and thence into the washer, and check valve 91 prevents clean solvent flowing to the filter without passing through the powder feeder.

By this arrangement the air is automatically eliminated from the system during the operation and before going through the filter screens, and is exhausted to the atmosphere.

This air eliminator may be used in the same way when filling the filter with solvent initially or after cleaning it out, as the inlet valve is open at that time and air would escape to the atmosphere through the feeder 40.

While the filter powder may be introduced into the feeder receptacle or housing 40 through a suitable hopper (not shown) at the top 41 of the housing and corresponding to the dotted or broken-line indication at the top of Fig. 2, so that the operator may use his own measurements of powder, this invention contemplates the use of a powder charge measuring device, sometimes referred to as a dispenser, and a bag-type hopper therefor, the whole providing an accurate, easy, simple and dustless means and method of handling and feeding the filter powder in the dry-cleaning room.

Thus, in Fig. 3 the dispenser or measuring device 120 is shown atop the feeder 40 and the hopper-like bag 121 having a sloping bottom portion and a gathered-in expansible top above the dispenser. Commercial diatomaceous or filter powder comes in standard 50-lb. bags. The capacity of hopper bag 121 of this device may be two such 50-lb. bags, this being satisfactory for a cleaning system having a 10- or 12-thousand-gallon per hour capacity filter, such as that described. The details of construction and operation of this bag 121 will be described later.

The powder-metering or dispensing device 120, as shown in Figs. 3 to 10, may consist of a metal housing 122, rectangular in horizontal cross section, which for convenience may be made in upper and lower parts suitably secured together at their overlapping edges, as at 123. The lower part is provided with a bottom opening, the rim of which is adapted to fit into the top opening 51 of feeder housing 40. An overlapping rim fold 124 fits over the upstanding rim of the opening top member 41 of receptacle 40, as indicated, to make a tight and secure joint therewith all around the opening. This opening may be rectangular also.

The upper part of the housing 122 may be formed across the top, as at 125, to accommodate and conform to the upper half of an enclosed metal measuring and dispensing cylinder or valve 126 which is supported by and affixed to a rotatable shaft 127 extending horizontally therethrough and through the enclosing ends of the cylinder, said shaft having bearings for its ends in the end members of said upper portion of housing 122. Said upper portion of the housing 122 may be provided with an opening in the top extending from end to end thereof and having an upstanding rim 128 around the four sides of the same, this opening being for the passage of powder from the hopper bag 121 above into the dispensing cylinder 126 in housing 122, the lower end of which bag is suitably and detachably secured to said rim 128, as will be explained.

The measuring cylinder 126 or rotary valve is provided in this instance with two surface lengthwise pockets or buckets 129 and 130 formed therein an any desired way between the ends of the cylinder, as by sheet-metal members secured together to form the sides and bottoms of the same or by coring out the same if the cylinder is cast, whereby to receive the powder from the bag 121 and to carry it around and empty or dump it into the lower part of the housing 122 and thence into the powder feeder container 40. These pockets or buckets receiving and carrying cups in the cylinder are preferably two in number and vary in size. They are preferably of 3- and 6-quart capacity respectively for a system of the size and capacity herein mentioned for reasons which will be explained, though of course may be of any desired size.

Arcs of lining 131, preferably of sponge rubber, are placed in the upper portion of housing 122 to bear and rub against the cylinder 126 in its rotation in either direction and thereby prevent the passage of any powder between the two or through the meter around the outside of the valve. These layers of sponge rubber 131 are retained in place at their lower edges by the inwardly extending edge flanges 132 on the side members of the housing. This rubber extends in a narrow strip over each end member of the cylinder, as at 133, the same being held in place by a narrow raised curved flange 134 above the same on the inside face of the end of the housing 122. Thus, the powder cannot work down the outside faces of the ends or sides of the cylinder.

Each pocket or bucket is provided with an inside supplemental ejecting bottom 135 pivoted along one edge in the bottom and weighted, as at 136, along the other edge, whereby when the bucket is in receiving position the bottom 135 is lying flatwise on the bottom of the bucket, and when the cylinder is turned down to discharge the contents of the bucket the weight of the ejecting bottom causes it to swing down and insure the discharging of the contents.

Figures 4, 5, 6, 7, 9:
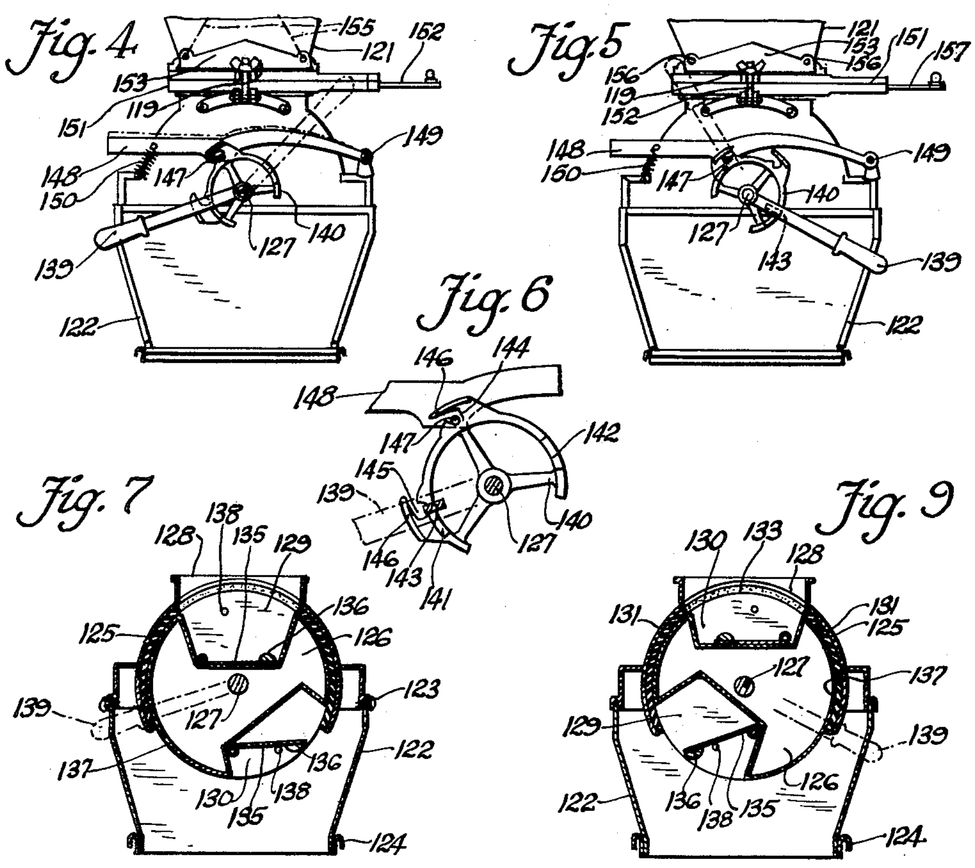
Figs. 4, 5 and 6 are end views of the powder-measuring device, the operating handle being in different positions.
Figs. 7, 8, 9 and 10 are cross-sectional views through the measuring cylinder or valve of the metering device, showing different positions.
Figure 8:
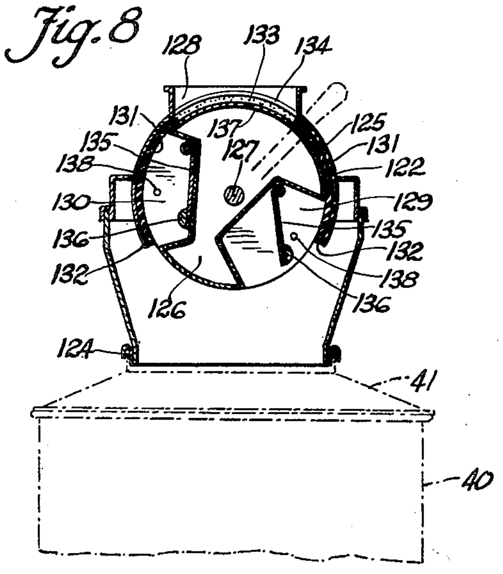

In this metering valve cylinder 126 it will be noted that the two pockets or buckets 129 and 130 are so related that a relatively wide arc 137 of the solid circumference is between them. This arc acts as a stop or dam to the flow of powder from above when it is beneath the inlet opening at the top. It so functions for both pockets by turning the cylinder one way or the other to fill and dump. Thus, Fig. 7 shows the cylinder with the large pocket in position for filling. Fig. 8 shows it when the cylinder has been rotated clockwise a partial revolution. In this position, the portion 137 of the cylinder is across the inlet, thus stopping the flow of powder, and the pocket 129 is in dumping position, the hinged bottom having swung downwardly to insure the ejection of the powder from the pocket.

Figure 10:
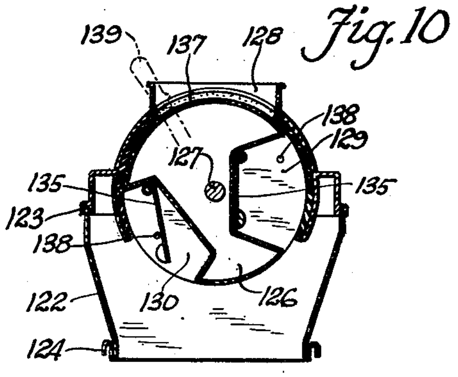

In Fig. 9, however, the cylinder is shown with the smaller pocket 130 uppermost in position for filling, the portion 137 lying over at the right. A partial counterclockwise rotation of the cylinder, as shown in Fig. 10, moves the filled pocket into dumping position and brings the solid part 137 of the cylinder across the inlet and stops the downward flow of powder. In this dumping position, the weighted hinged bottom of the smaller pocket swings downwardly to insure ejection of the powder from the cup. A suitable stop pin 138 may be provided in each cup 129 and 130 to limit the outward swing of the pivoted bottom to prevent any possible jamming or failure to swing back into position on the bottom when the cup is turned upward into filling position.

As a means of so rotating or vibrating the metering cylinder or valve 126, there is provided in this instance a handle 139 affixed to the shaft 127 outside and at the end of the housing 122. Operation of this handle into the various positions indicated in Figs. 3 to 10 suitably operates the cylinder as described. In order readily to operate this handle without special care on the part of the operator, so that the buckets may be brought properly into filling and dumping positions, and particularly so that either the small or the large pocket may be repeatedly operated, to the exclusion of the other and likewise without special care on the part of the operator, a suitable stop device 140 in the form of a partial ring, quadrant, plate, or wheel is freely mounted on the shaft 127 at the inside face of the handle 139. This ring device near the ends of its circumferential arc, Fig. 6, is provided with stop lugs 141 and 142 projecting toward the handle. The handle itself on the inside face toward the stop is provided with a stop lug 143 shown in section in Fig. 6 and in dotted lines in Fig. 5. The handle stop lug is adapted in the vibration of the handle to strike against the stop lugs 141 and 142 on the stop device 140 at either end of its vibrational movement.

This movement of the handle between these two stop lugs 141 and 142 is sufficient to move either bucket in the cylinder from filling position to dumping position, and vice versa. It only remains, therefore, adjustably to fix the ring stop device 140 in one position or the other around the shaft 127, so to confine the vibrational movement of the handle to the operation of one or the other of the sprockets or buckets. This is done by providing the ring or stop device 140 with spaced circumferential stop notches 144 and 145, each having an overhang 146 facing each other. A stop pin 147, mounted on lever 148, which is pivoted at 149 on the housing 122, is adapted to engage in one or the other of notches 144 and 145 when the stop ring is turned accordingly on the shaft 127, and to ride on the circumference of the ring between the notches when the lever is released. The lever 148 projects at its free end to form an operating handle, and a spring 150 constantly pulls the handle downwardly and the pin 147 into engagement with the stop device 140. The overhangs 146 act as stops to limit the upward movement of the lever 148 when it is struck or raised by the hand to free the pin from the notches.

Thus, when the stop ring 140 is stopped and held at either limit of its rotative movement, the handle 139 operating between its stops on the ring will suitably operate the cylinder or valve to fill and dump the pocket or bucket corresponding to the stopped position of the ring.

The shifting of the ring stop 140 from one end position to the other may be done most readily by the handle 139 while engaging its stop on the ring and when the lever 148 is raised initially to free its pin 147 from the notch. The ring stop is thus pushed by the handle around to its opposite position, where the pin 147 snaps into its notch on the ring at that end and holds the ring in that position. Continued operation of the handle with the ring in this new position results in filling and dumping the other pocket in the cylinder, as described. These parts are all ruggedly built and safely withstand more or less rough usage in handling and operation. The operator, therefore, may quickly dump a measured quantity of powder into the ejector without special attention or care and may shift from one measured quantity to the other with equal facility. No careful adjustments are necessary.

The larger pockets or buckets are conveniently used when pre-coating the screens of the filter, say, at the beginning of the day's run, when about two such dumpings are usually sufficient for the purpose in a system of the capacity mentioned. Thereafter, during the day, with each batch of garments cleaned one of the small buckets may be dumped into the feeder and is ordinarily satisfactory. Various factors enter into such powder feeding. The manufacturer of the apparatus usually furnishes a recommendation card which is posted in the plant for the guidance of the operators and which gives the amounts and rate of feed for the different conditions apt to be encountered. As above stated, the valves 46 and 87 in this feeder may be used in controlling the rate of feed from the feeder; and, of course, the gross amount fed is controlled by the meter.

The filter powder hopper bag 121, Fig. 3, is preferably of flexible material which is impervious to powder, dust or moisture, such as vinyl polymer resin, vinyl coated bandolier cloth, or other suitable material. Its lower end is detachably secured to the top of the rim 128 of the measuring valve housing or casing 122 by a two-part frame 151 having a sheet cut-off slide 152 which is suitably slidable between the two parts of the frame to close the opening therethrough to the passage of the powder from within the bag. The two parts of the frame may be secured together by screws and the frame itself is detachably secured to the rim of the valve casing by bolts 119, one at each end, pivoted to suitable lugs secured to the outside of the rim 128 and passing between lugs on the edge of the two-part frame and a wing nut on the upper end of the bolt. By loosening these nuts, the bolts may be swung outwardly to free the lugs on the frame. In this way the frame and bag are tightly secured to the measuring valve and are readily detached therefrom.

The lower end of the material of the bag is secured to this two-part frame in any desired way to make a powder-tight and mechanically strong joint, as by rolling its edges outwardly around a cord or wire to form a bead which is held in place under end bars 153 and side rails 154, which in turn are secured by screws, or otherwise, to the top of the two-part frame 151.

The bag is held in upright positions and the weight of the contents carried by chains or cables 155, one on either side, having branching lower ends secured to lugs 156 on the end bars 153 of the two-part frame 151. The upper ends of the chains may be sustained by the swivel hook 157 of a suitable hoist above (not shown). The chain may be attached to or engage suitable lugs or pins 158 near the upper end of the bag which project from a metal ring 159 secured in any suitable way on, in or to the material of the bag. A second metal ring or hoop 160 is secured to the bag adjacent the top of the sloping lower end, as by suitable loops 161 or otherwise, to prevent collapse of the bag.

The upper end of the bag above the ring 159 may be entirely closed by gathering or folding it together upon a wood spool type of disc 162 inserted therein and the same secured thereto by tightening the drawstring or strings 163 in the bag about the periphery of the disc.

The hopper bag may be filled by closing the slide 152 at the bottom, releasing the wing nuts of bolts 119, raising it slightly by the hoist and lowering it at one side to a light hand truck (not shown), upon which it may be held erect by hooks on the truck engaging the pins 158. If desired, the hopper may then be trucked to another room for filling, where the then opened end of the up-ended hopper may be drawn down over an upright commercial bag of the powder which has been opened. The drawstrings are then tightened about the commercial bag, the truck tipped forwardly to engage the pins 158 and then straightened up to lift the hopper into upright position with the up-ended bag of powder in it, and then shaking and lifting out the emptied bag and tightening the drawstrings of the hopper. A second 50-lb. bag may be emptied in a similar manner into the measuring bag, after which the disc 162 is inserted, the drawstrings tightened, and the filled hopper bag is returned to the cleaning apparatus and hoisted into and secured in position on the measuring device.

Thus, a charge of powder for a considerable period of operation of the system is supplied substantially without dust and loose powder in the dry-cleaning room. Thereafter, as above explained, the powder is handled wholly within the apparatus and without contact with the garments being cleaned. The hopper bag may be light in weight. The weight of powder is carried by the chains 158 rather than by the bag itself. The material of the bag is flexible and may be indented or deformed temporarily without harm, as by a slap or blow of the hand of the operator, in case the powder inside needs dislodging to make it flow out readily. The sheet metal slide 152 at the bottom of the bag 121 is compressed and slides between sponge rubber strips on the three sides of the frame 151 and abuts a similar strip of sponge rubber at the back of the frame.

Figure 16:
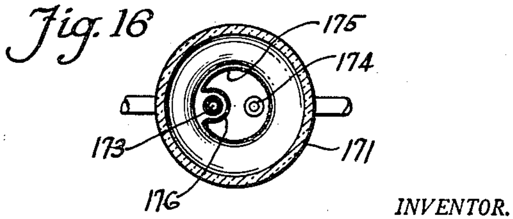
Fig. 16 is a cross section on the line 16—16 of Fig. 15.
Figures 17, 18:
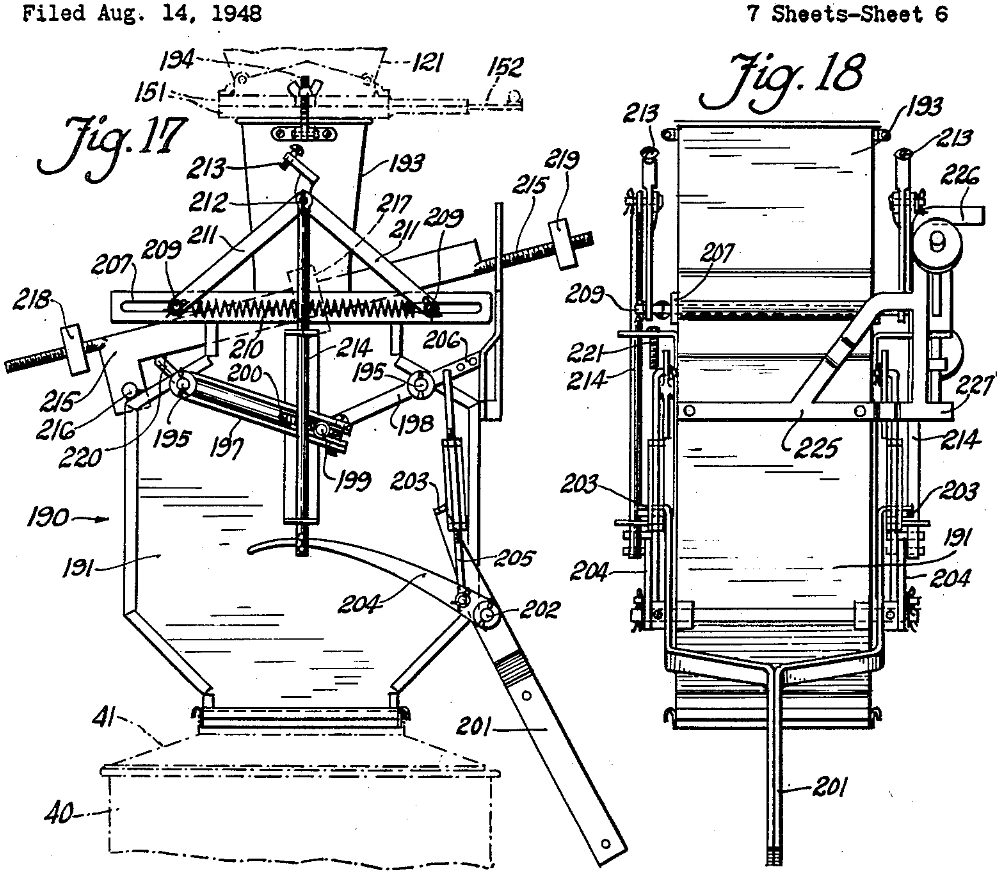
Fig. 17 is a side elevation of the powder weight metering device.
Fig. 18 is an elevation of the same.

Now returning to the visual indicator and filter 170 in the bleeder line 90, and shown in detail in Figs. 15 and 16, a glass jar 171 or similar receptacle may be interposed between the gate valve 92 and the check valve 91, a special screw-threaded and gasketed top 172 thereof having an entrance tube or pipe 173 tightly threaded within and through the top and extending down into the jar a suitable distance and connected at its upper end to the bleeder line 90 toward the gate valve. A similar exit tube or pipe 174 is likewise threaded into and through the top 172 but does not extend into the jar below the inner surface of the top, and is suitably connected to the line 90 toward the check valve.

It is apparent that in operation the solvent and air being impelled through the bleeder line 90 will pass down into the jar through tube 173, the liquid filling up in the jar and the air separating from the liquid and bubbling up through the liquid and both going out the exit tube 174 and on into the bleeder line 90.

This action in the jar gives a visual indication to the operator of what is going on in the system and whether or not its performance is satisfactory. Thus the air bubbling through the jar tells him, when filling the main filter after it has been cleaned or is being initially filled, that it is full of solvent and operating satisfactorily. Again, the device shows how the filter powder is being handled in the system. If there is any powder in suspension in the solvent, it shows up in the indicator 170. When pre-coating the main filter screens, for instance, the powder in the solvent appears in the indicator. When the solvent in the indicator clears up or the powder in it disappears, it indicates to the operator that the screens are coated. Also, in operation, when batches of powder are introduced into the feeder, the powder will appear in the visual indicator 170 and show whether it is feeding properly or not, at the proper rate, or how long it so feeds. Thus the operator sees how long it takes the powder which he has put into the feeder to be deposited on the screens. He is thus given information enabling him to regulate the flow of powder from the feeder to the filter by manipulating the valve 46 or 87, or both, as he sees fit.

While a filter is not necessary in the bleeder line 90, it may be desirable to screen out the coarser particles of foreign matter, such as lint or the like, and for that purpose a relatively coarse mesh screen 175 may be inserted in the jar 171, the screen being cylindrical except for a longitudinal re-entrant bend 176 for the tube 173. This screen is small enough in diameter readily to pass through the neck of the jar 171 and long enough to reach between the bottom and the top of the jar.

As thus constructed, the liquid comes into the jar 171 through the tube 173 outside the screen 175, passes to the central portion thereof, and up out the tube 174. The air follows the same course and will be seen bubbling up through the liquid from the lower end of pipe 173. Any large particles that happen to get into the line 90 are screened out in this visual indicator. The screen is readily cleaned by first closing valve 92, unscrewing the body of the jar 171 from the top 172, lifting out the screen 175 by the fingers, shaking it, washing it if desired, and replacing it in the jar in the same way. This can be done without interfering with the operation of the system otherwise than momentarily stopping the flow through pipe 90.

Again referring to Fig. 1, a by-pass 180 may be arranged around the washer 20, the same having a suitable gate valve 181 therein and a similar valve 182 being placed in the line 21 to the washer. This by-pass may take the place of the path for solvent through the washer when the filler screens are being pre-coated, thus permitting the washer to be used for any other purpose during this time, such as "soaping," or other purposes, and thus saving time. The coating of the screens may require fifteen minutes or so, and by using the by-pass, the washer may be used during that time for mixing the soap and solvent, called "soaping," preliminary to putting the garments into the washer.

In so using the by-pass system, a small auxiliary enclosed tank (not shown) may if desired be connected with the by-pass below the solvent level in the washer, or the by-pass itself be enlarged at that point to insure an adequate supply of solvent to the system.

It will be understood that there are various sizes of filters. Accordingly, the pockets in the valve of the dispenser may be made to suit the different sizes of filters.

The operation of the system as a whole will be understood from the foregoing. With the main valves open and the system operating normally, the filter powder is dumped into the feeder tank 40 and becomes thoroughly mixed with the solvent therein and the mixture is fed out at the desired rate into the suction line of the pump. There it mixes with the stream of solvent from the washer and is forced by the pump into the filter. Here the powder is deposited on the filter screens and the air escapes through the bleeder pipe to the feeder chamber, which is at atmospheric pressure, any solvent drawn off therewith remaining in the feeder chamber to become mixed with the solvent therein and discharged therewith into the main stream. At the same time solvent from the main line 30 is discharged into the feeder chamber at the same rate it is drawn out, this rate being controlled by the valve 46 or 87 or both. The float in the chamber controls the operation of the inlet and outlet valves, and preferably normally permits a continuous flow of solvent therethrough. The operator merely has to dump the powder by the measuring device at stated times and the feeder takes care of it. The rate at which it feeds is controlled by the valve 46 or 87, and one batch of powder may thus be fed into the stream before another is put into the feeder. But the flow of solvent through the feeder continues and the air from the filter is being continuously drawn off. All this is irrespective of the working of the washer. The filter powder does not get into the washer or button trap.

It will be understood that the system may be supplied with other connections, valves, sight glasses, gauges and the like, which may be supplied in the installation but which are not shown here to avoid complication.

The powder-dispensing, measuring or metering device 120 in the foregoing depends upon measurement by volume of the charges of powder or the like which are fed into the feeder 40. It may be desired, however, to meter the powder or the like which is so introduced into the feeder of the system according to its weight rather than by its volume. Accordingly, in Figs. 17 to 22, a dispenser or measuring device, generally designated by 190, is shown which weighs the charges of powder so fed into the feeder of the system. This meter 190 takes the place of the volume meter 120 in the system, is attached to the top of the feeder 40 in the same way, and the hopper bag 121 is detachably secured to the top of the weighing meter 190 the same as in the case of the volume meter 120. The operation of the system as a whole is otherwise the same as in the foregoing and need not be repeated. The construction and operation of the weight meter itself is as follows.

A metal casing 191, rectangular in cross section, containing a two-part weighing bucket 192, has an open bottom, the rim of which is adapted to fit into the opening in the top 41 of the feeder housing 40, in the same way as the volume meter casing 122, and firmly secures the meter to the housing. The upper part of the casing 191 terminates in a reduced neck portion 193, on the upper end of which is secured the lower end frame 151 of the hopper bag 121 with its cut-off slide 152, in the same way as in the case of the volume meter 122. This bag is releasably secured in place by swing bolts 194, the same as the bolts 119 on the volume meter and for the same purpose.

Figure 19:
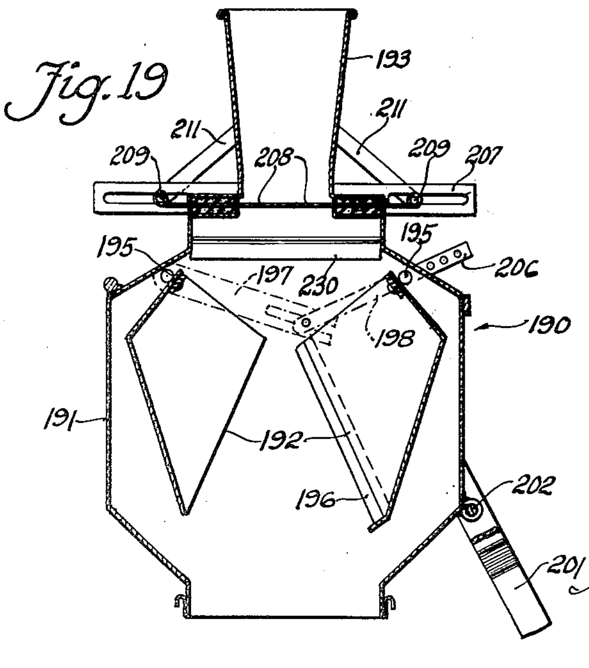
Fig. 19 is a vertical cross section of the said device.

The two halves of the bucket 192 are rigidly mounted at their upper outer corners on shafts or rods 195 extending across and rotating in the casing. When swung together, as shown in dotted lines in Fig. 22, the bucket is closed at the meeting edges of the halves and is open at the top to receive powder from the hopper 121. When swung open like a clam-shell bucket, as seen in Fig. 19, the bucket 192 is open to discharge its contents into the feeder 40. One of the meeting edges of one of these bucket parts is provided with an overlapping flange 196 (Fig. 19) to overlap the corresponding edge of the opposite part, where the two parts are closed to make a powder-tight joint between them.

These two shafts 195 are caused partially to rotate or vibrate together properly to open and close the bucket by lever arms 197 and 198 secured thereto outside the wall of the casing 191, the inner ends of which overlap and are secured together by a pivot bolt 199 which is also slidable in a slot in lever 197 and is strongly pressed against by a coil spring 200 mounted longitudinally in the lever 197. This pivot pin, by sliding in the slot, permits the two levers to approach a horizontal position to bring the two parts of the bucket together or to swing down sufficiently to open the bucket parts, as shown. Thus, the two parts of the bucket are caused to move simultaneously, and the spring strongly presses them toward the open position.

The buckets are pulled into closed position by the handle 201, which may be metal straps pressed and secured together at their outer parts to form a handhold and their inner parts spread apart to overlap the sides of the casing and loosely pivoted on the ends of a shaft or bar 202 fixedly secured to the outside of the casing 191. The inner ends of these yoke-like handle members are bent outwardly, as at 203, and are adapted in their downward swing to engage the top of a lever 204 on each side of the casing and journaled on the projecting ends of bar 202. The inner ends of these levers 204 are arranged to pull down vertical rods hereinafter described. For the purpose of closing the bucket parts, they are connected by rods or links 205, having suitable turn-buckles therein for lengthwise adjustment, with outwardly extended lever arms 206 fixed on the ends of adjacent shaft 195. The lever arm 206 on the same side of the casing 191 as the arms 197 and 198 may be integral with the arm 198 if desired, and both arms are provided with several holes therein for different connections of the link rods 205 therewith. With this arrangement, the lifting of the outer end of handle 201 causes its lugs 203 to engage the tops of levers 204 and to press them downwardly. These in turn pull the links 205 downwardly, turning the shaft 195 and raising the lever arm 198; and this, through the pin 199 and slot connection correspondingly raises lever 197 and rotates the other shaft 195. The limited rotation of these shafts 195 closes the two parts of the bucket 192 together.

Since the entrance of the powder to the bucket should be closed when the bucket is opened for dumping and practically instantaneously with the start of the bucket to open, the folowing provision is made.

Suitable horizontal slideways 207 are secured to the casing 191 along the ends of the neck opening into the body of the casing. Two sheet metal slides 208, 208 are fitted to slide horizontally in these ways to cut across the stream of powder flowing down the neck 193 or to open the passage. They meet at the center to close the same. At their outer edges, stiffening bars are secured to said slides with their ends 209 projecting through slots in said slides. Strong coil springs 210 extend between the projecting ends 209 of the slide bars and are tensioned strongly to draw the slides 208 together. Lever arms 211, in the nature of toggle levers, are pivoted to the ends 209 of these bars and their meeting ends are pivoted together by pins 212. One of each pair of toggle arms 211 is provided with an adjusting stop screw 213 to prevent the arms passing or approaching too closely the dead-center horizontal position, as in Fig. 22.

A vertical rod 214 on each side of the casing 191 is pivoted at its upper end to pin 212 at the elbow of the toggle levers 211, is vertically slidable in suitable brackets attached to the outside of the casing, and at its lower end has inwardly extending pins above and below the inner end of lever 204 before referred to, or other suitable connection therewith, so that the two move up and down together. Thus, the raising of the outer end of the handle 201 not only closes the bucket but pulls the vertical rods down, flattens out the toggle arms 211 and forces open the slides 208 in the neck 193 to permit the powder to flow into the closed bucket. Likewise, as will be pointed out, the release of the bucket parts to open permits both sets of springs 200 and 210 to exert their force to open the bucket and to close the slides, and the action is practically instantaneous.

The bucket is dumped by the weight of the material when the desired amount is filled therein. This may be accomplished by providing a scale beam 215, preferably on the other side of the casing 191 from the levers 197 and 198, said beam being pivoted on the pivot 216 secured to casing 119 and having suitable scale marks thereon for the different weights to be weighed in the bucket, with preferably a suitable sliding balance weight 217 thereon with setscrew therein for preventing it from dislodgement by jars or the like. Threaded adjustable balance weights 218 and 219 may also be located on the beam 215.

On the opposite end of the shaft 195 from the lever 197 and adjacent the scale beam 215 and its pivot 216, a trigger arm 220 is rigidly secured to said shaft 195. The end of this arm is turned at right angles and extends under and in contact with the lower edge of the scale beam 215. The scale beam rests on it, and when the bucket is closed and the slides 208 are open, these parts are in substantially the position shown in Fig. 22. This is the bucket-filling position. If the handle 201 has been released, it is hanging down, as in the other figures, so as to release the other parts from any effect thereof tending to hold the parts in that position. At this time the toggle levers or arms 211 are nearly horizontal, being regulated by the adjusting screw 213, and the same is true of the arms or levers 197 and 198, their upward position being regulated by the adjusting stop screw 221 in the upper bracket for the vertical rod 214 on that side of casing 191. The coil springs 200 and 210 are tensioned to cause the arms when free to spring to their angular positions, that is, to close the slides and open the bucket. All that restrains and prevents them from so doing at this time is the resting of the scale beam 215 on the end of trigger arm 220. That prevents the shaft 195 on which it is located from turning and thus swinging the buckets open and the raising of rods 214 through levers 204, connecting rods 205 and lever arms 206. The springs, stops and other parts, including the weights 218 and 219 on the scale beam and the sliding balance weight 217 thereon, are all adjusted and poised at this time so that when the desired powder charge pours into the bucket the weight thereof in the bucket is enough to swing the two parts of the bucket open, rotating the shaft 195 and trigger arm 220 against the restraining effect of the scale beam. All that is needed is the start of the bucket to open, when the springs take over and snap the parts of their reverse positions, with the slides closed and the bucket open for dumping.

In this connection it may be mentioned that the slides 208 are engaged by sponge rubber suitably held in place, as in the case of the slide 152 of the powder hopper, to prevent the working of the powder thereinto and escape of same. It is found that the powder does not work into the sponge rubber and destroy its resilient qualities, as it tends to do with felt or the like. A stop device 225 for the free end of the scale beam 215 may be secured to the casing 191, said device having projecting ends 226 and 227 extending over and under the beam at the limits of its vibrational movement. An inwardly and downwardly sloping strip or flange 230, Figs. 19 and 21, is secured in each end of the passage of the casing 191 into the body of the casing to direct the falling powder over the top end edges of the bucket.

As stated, this weight-metering device fits into the cleaning system of the other figures in the place of the volume-metering device 122, the operation of the system being the same except that now the operator does not actually dump the powder himself but merely places the device in condition to dump it by the manual operation of the handle 201 and the device weighs and empties the charges into the feeder 40 of the system.

Figures 20, 21, 22, 23:
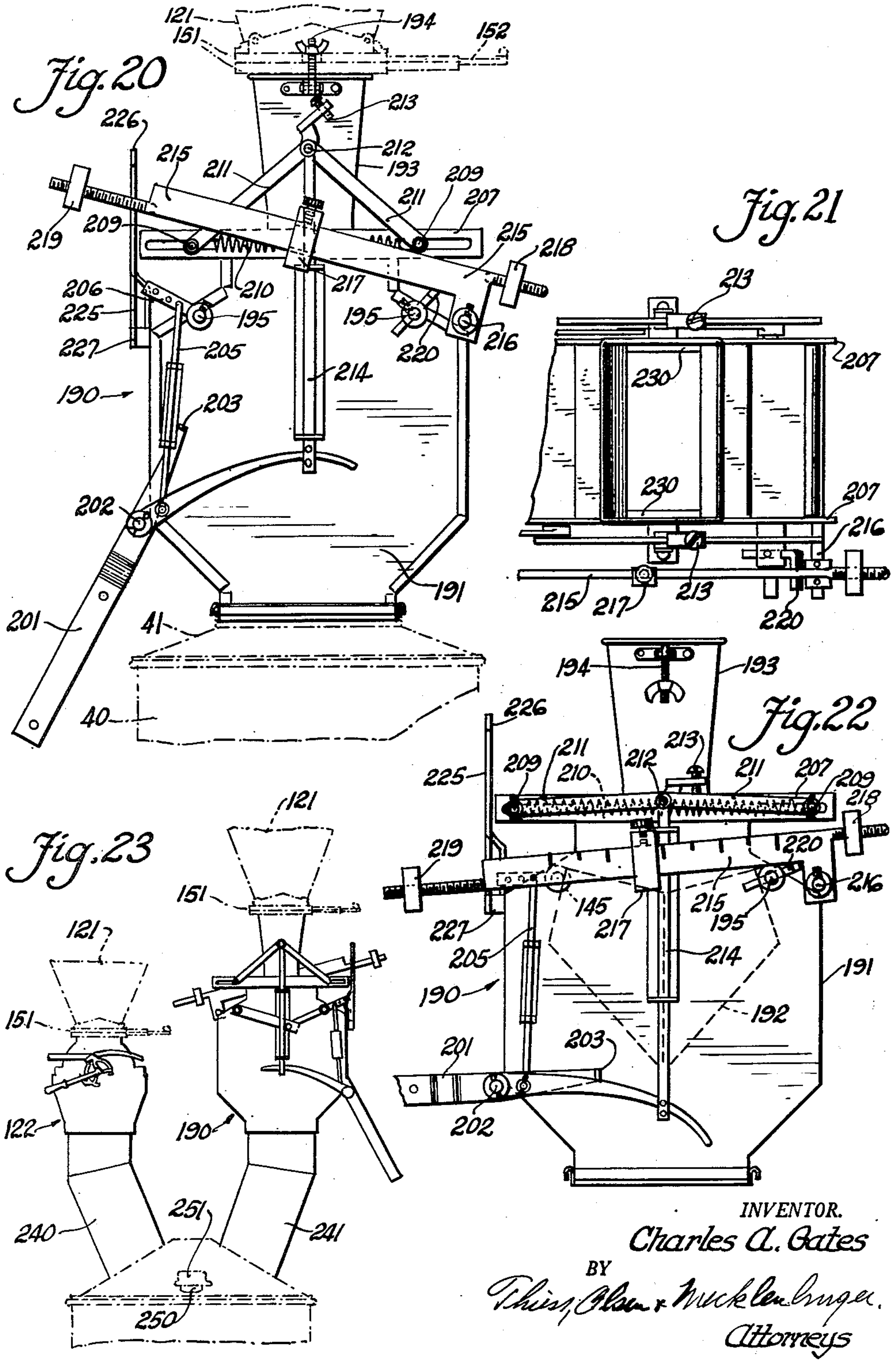
Fig. 20 is an elevation of the side opposite Fig. 17.
Fig. 21 is a partial plan view of the device.
Fig. 22 is a similar view with the weighing scale bar and operating handle in weighing position.
Fig. 23 shows both types of powder meters in the system.

Fig. 23 shows the system in which the feeder 40 may be equipped with both the volume meter 122 and the weight meter 190 by the use of separate branches 240 and 241 from the top of the filter feeder. By this means either meter may be used at any time in the operation of the system. In some plants it may be desired to use the same kind of metering device in both branches 240 and 241. It may also be desirable to use different filter aids in the cleaning process and to have at hand a supply of each ready for immediate inclusion in the system. In such case the two branches may be used and the metering devices be alike or different.

In Fig. 23 the filter feeder 40 is also shown with an opening in the top having a tubular projection 250 around it and a cup-like cap 251 covering the same. Such an opening may be used for introducing into the feeder 40 a quantity of finely divided carbon or vegetable charcoal or the like, which is sometimes desired as a purifier of the solvent. The cap 251 may be used as a measuring cup for the introduction of such material. The same sort of an opening cap may, of course, be applied to the feeder 40 in the other figures of the drawing and for the same purpose.

While the term "powder" is used herein, it is intended to include thereby whatever filter aids may be desired or employed.

While the apparatus has been shown and described in detail, it will be understod that variations may be made therein without departing from the essential principles of the invention; also, that while dry-cleaning systems have been specifically referred to, various features of the invention are applicable to other filtering systems, such as may be involved in the manufacture of paint, varnish, wine, smaller corn product plants, and the like.

Without further elaboration, the foregoing will so fully explain the gist of the invention that others may, by applying current knowledge, readily adapt the same for use under varying conditions of service, without eliminating certain features which may properly be said to constitute the essential items of novelty involved, which items are intended to be defined and secured by the following claims.

I claim:

1. The method of feeding filter powder into the circuit of a dry cleaning system having a washer, pump, and filter in series in the circuit, comprising withdrawing solvent from the circuit in advance of the washer into a receptacle, introducing powder into the receptacle, mixing the powder and solvent together in the receptacle and discharging the mixture into the circuit at the intake of the pump and after the washer, and automatically controlling the flow of said solvent into and the discharge of the mixture from the receptacle during the cleaning operation of the system by the level of the solvent in the receptacle.

2. In combination, a washer, a pump and a filter, conduit means for connecting said washer, pump and filter in the order named in a fabric cleaning system, a filter powder feeding receptacle having an inlet and an outlet, a conduit connecting said inlet to said conduit means between said filter and said washer, a conduit connecting said outlet to said conduit means between said washer and said pump, and means associated with said filter powder feeding receptacle for feeding a mixture of powder and solvent into the dirty solvent flowing from said washer to said filter to blend therewith and to be fed together by said pump to said filter during the cleaning operation.

3. In combination, a washer, a pump and a filter, conduit means for connecting said washer, pump and filter in the order named in a fabric cleaning system, an open end filter powder feeding receptacle having fluid inlet and outlet connections, a conduit connecting said inlet to said conduit means between said filter and said washer, a conduit connecting said outlet to said conduit means between said washer and said pump; means associated with said filter powder feeding receptacle for feeding a mixture of powder and solvent into said conduit means through said conduit connecting said outlet to said conduit means during the cleaning operation, and means for closing off said last conduit before said receptacle is completely emptied of solvent.

4. In combination, a washer, a pump and a filter, conduit means for connecting said washer, pump and filter in a fabric cleaning system, an open end filter powder feeding receptacle having fluid inlet and outlet connections, a conduit connecting said inlet to said conduit means between said filter and said washer, a conduit connecting said outlet to said conduit means between said washer and said pump, and means tending to maintain a predetermined quantity of solvent in said filter powder feeding receptacle and to feed the same in a mixture with powder through said conduit connecting said outlet to said conduit means during the cleaning operation, there being provisions to close off said outlet when said filter powder feeding receptacle tends to empty of solvent.

5. In combination, a washer, a pump and a filter, conduit means for connecting said washer, pump and filter in a fabric cleaning system, a filter powder feeding receptacle having fluid inlet and outlet connections, a conduit connecting said inlet to said conduit means between said washer and the outlet side of said pump, a conduit connecting said outlet to said conduit means between said washer and the intake side of said pump, and means associated with said filter powder feeding receptacle for feeding a mixture of powder and solvent from said receptacle into the dirty solvent flowing through said conduit means from said washer to said pump during the cleaning operation.

6. In combination, a washer, a pump and a filter, conduit means for connecting said washer, pump and filter in a fabric cleaning system, an open end filter powder feeding receptacle having fluid inlet and outlet connections, means for establishing a turbulence of the fluid in said receptacle to bring the powder in said receptacle into an intimate mixture with the fluid, and means for feeding the mixture through said outlet into the system at the intake side of said pump during the cleaning operation, said means closing off said outlet connection upon termination of the supply of fluid at said inlet connection.

7. In combination, a washer, a pump and a filter, conduit means for connecting said washer, pump and filter in a fabric cleaning system, a filter powder feeding receptacle connected in said system and having fluid inlet and outlet connections, means for feeding filter powder in batch quantities into said receptacle, means controlling said fluid inlet connection to provide a flow of fluid into said receptacle to mix with the filter powder, and means for feeding the mixture of filter powder and fluid into said system through said outlet connection, the mixture entering the system to blend with dirty solvent flowing from said washer to said filter during the cleaning operation, and means to close off said outlet connection when said inlet connection discontinues feeding fluid into said receptacle.

8. A filter powder feeding receptacle for use in a fabric cleaning system having a washer, a pump and a filter with conduit means connecting said washer, pump and filter in said system, said receptacle comprising an open tank into which filter powder is supplied, a fluid inlet connection, a fluid outlet connection, means in said tank for closing off said inlet connection when said tank receives a predetermined quantity of fluid therein, and means for maintaining a liquid seal at said outlet by closing off said outlet before said tank is completely emptied of fluid.

9. A powder feeding receptacle for feeding a mixture of powder and fluid into a closed fluid system, said receptacle comprising an open tank into which powder is supplied, a fluid inlet connection, a fluid outlet connection, means in said tank for closing off said inlet connection when said tank receives a predetermined quantity of fluid therein, and means for maintaining a liquid seal at said outlet by closing off said outlet before said tank is completely emptied of fluid.

10. A powder feeding receptacle for feeding a mixture of powder and fluid into a closed fluid system, said receptacle comprising an open tank into which powder is supplied, a fluid inlet connection, a fluid outlet connection, means in said tank for closing off said inlet connection when said tank receives a predetermined quantity of fluid therein, and means for maintaining a liquid seal at said outlet.

11. In combination, a washer, a pump and a filter, conduit means for connecting said washer, pump and filter in the order named in a fabric cleaning system, an open end filter powder feeding receptacle having fluid inlet and outlet connections, means for feeding solvent to said inlet, a conduit connecting said outlet to said conduit means between said washer and said pump, means associated with said filter powder feeding receptacle for feeding a mixture of powder and solvent into said conduit means through said conduit connecting said outlet to said conduit means during the cleaning operation, and means for closing off said conduit before said receptacle is completely emptied of solvent.

12. In combination, a washer, a pump and a filter, conduit means for connecting said washer, pump and filter in the order named in a fabric cleaning system, a filter powder feeding receptacle connected in said system and having an inlet and an outlet, means for feeding a solvent to said inlet, and means associated with said filter powder feeding receptacle for feeding a mixture of powder and solvent into the dirty solvent flowing from said washer into said filter to blend therewith and to be fed together by said pump to said filter during the cleaning operation.

References Cited in the file of this patent

UNITED STATES PATENTS

| Number | Name | Date |
|---|---|---|
| 731,452 | Hamfeldt | June 23, 1903 |
| 848,999 | Kratzenstein | Apr. 2, 1907 |
| 921,941 | Ballard | May 18, 1909 |
| 1,204,733 | Barton | Nov. 14, 1916 |
| 1,309,059 | Bacon | July 8, 1919 |
| 1,363,487 | Taber | Dec. 28, 1920 |
| 1,515,130 | Morrison | Nov. 11, 1924 |
| 1,553,973 | Ballou | Sept. 15, 1925 |
| 1,613,531 | Pfisterer | Jan. 4, 1927 |
| 1,669,235 | Fenton | May 8, 1928 |
| 1,695,627 | Zerk | Dec. 18, 1928 |
| 1,814,212 | Glover | July 14, 1931 |
| 1,878,874 | McBride | Sept. 20, 1932 |
| 1,999,624 | Biazzi et al. | Apr. 30, 1935 |
| 2,044,185 | Pugh | June 16, 1936 |
| 2,087,775 | Matthews | July 20, 1937 |
| 2,101,014 | Angelus | Nov. 30, 1937 |
| 2,210,719 | Hodges | Aug. 6, 1940 |
| 2,216,719 | Marvel | Oct. 8, 1940 |
| 2,254,269 | Clark | Sept. 2, 1941 |
| 2,278,148 | Monsarrat et al. | Mar. 31, 1942 |
| 2,301,803 | Davis | Nov. 10, 1942 |
| 2,424,675 | Wood | July 29, 1947 |